March 26, 1940.    R. V. BOYER    2,195,233
ELECTRICAL COIL
Filed July 8, 1938

SHEET LAYER INSULATION
COMPRISING SHRUNKEN
PRE-STRECHED
POLYVINYLAL RESIN

Inventor:
Ralph V. Boyer,
by Harry E. Dunham
His Attorney.

Patented Mar. 26, 1940

2,195,233

UNITED STATES PATENT OFFICE 2,195,233

ELECTRICAL COIL

Ralph V. Boyer, Nahant, Mass., assignor to General Electric Company, a corporation of New York Application July 8, 1938, Serial No. 218,151

6 Claims. (Cl. 175—21)

The present invention relates to electrical coils and is concerned more particularly with the production of a compact, high dielectric strength coil characterized by its rigidity and its high resistance to moisture, abrasion and such solvent agencies as oil, chemicals and the like.

The novel features of the invention are set forth in the appended claims. The invention itself will best be understood from the following detailed description when considered in connection with the accompanying drawing illustrating an embodiment of the invention and in which Fig. 1 is a perspective view showing the first step in making the coil of the invention;

Figure 1:
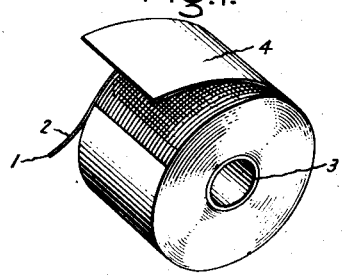

I have discovered that an electrical coil of extreme rigidity and resistance to oil, dust, dirt, moisture, solvents, etc., can be prepared with a minimum amount of material and little labor by using as insulation, as hereafter more fully will be described, a synthetic resinous material of the class produced by condensing an aldehyde with a product of hydrolysis of a polyvinyl ester. Such resinous materials are described, generally, in Reissue Patent No. 20,430, Morrison et al., and, as pointed out in said patent, may be produced from various aldehydes and various polyvinyl esters. More particularly it may be stated that such resins are produced by condensing formaldehyde, acetaldehyde, propionic aldehyde, butyric aldehyde, benzaldehyde and the like with a partially or completely hydrolyzed polyvinyl ester such as polyvinyl acetate, polyvinyl propionate, polyvinyl butyrate and the like. In the following description of the invention and in the appended claims, this class of resins is designated, generally, as "polyvinylal resins". In practicing the present invention I prefer to use a polyvinylal resin obtained by condensing formaldehyde with a product of hydrolysis of polyvinyl acetate.

In carrying this invention into effect a suitable conductor, for example a copper wire 1, is first provided in any suitable manner with a covering of suitable insulation 2 such as enamel, paper, etc. The conductor insulation advantageously may be a polyvinylal resin film. The insulated wire is wound on a suitable temporary or permanent core 3 such, for instance, as a shellac-coated kraft paper tube or a molded phenol-aldehyde resin tube. The layers of helices of insulated wire are separated, as the winding takes place, by a thin sheet of layer insulation 4 comprising a polyvinylal resin. Preferably this sheet covers also the last layer of conductor helices. I prefer to use dry thin films of polyvinylal resin ranging, for example, from 1 to 15 mils in thickness. Such films may be prepared in any suitable manner as, for instance, from a solution of the polyvinylal resin. In certain cases, particularly with films 5 to 10 mils in thickness or thereabove, the thickness depending upon insulation requirements, the resin film may be produced by extrusion of the solid resin or by sheeting the resin on hot rolls or the like. Suitable plasticizers may be incorporated in the polyvinylal resin, as desired or as conditions may require, for example dibutyl phthalate, diamyl phthalate, butyl tartrate, tricresyl phosphate, benzyl benzoate, triacetin, tripropionin, etc.

Prior to use as layer insulation the resin films preferably are stretched in a warm condition, for example at 60° to 80° C., to an extent which will give the desired shrinkage in a subsequent heat treatment. Sheet layer insulation comprising polyvinylal resin film initially set in a pre-stretched condition can be shrunken, for example by releasing the stress under heat, into intimate contact with the winding layer turns to an extent exceeding that obtainable with normal polyvinylal resin film similarly applied. Films having the desired shrinking qualities also may be formed from solution, specifically when the cast films are dried under stress.

Figure 2:
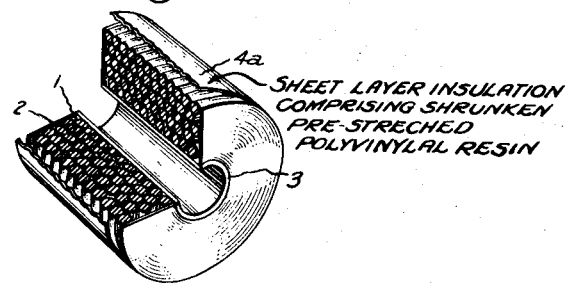
Fig. 2 is a view similar to Fig. 1 but broken away for the sake of clearness and showing the coil after being heat-treated in accordance with the invention.
Figure 3:
Fig. 3 is a fragmentary sectional view showing how the layer insulation used in making the coil separates the superposed insulated conductor layers and assumes the contour of the said layers.
Figure 4:
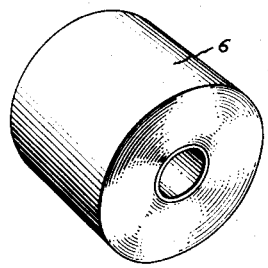
Fig. 4 is a view in perspective showing a completed coil.

After the coil has been wound with the dry, thin films of polyvinylal resin between each two layers of conductor helices, the coil is heated or baked by any suitable means at an elevated temperature, for example, at approximately 100° to 225° C. or thereabove for from 1 or 2 minutes up to 15 or 20 minutes, depending upon the softening point of the specific polyvinylal resin employed, the size of the coil and the time required to bring the innermost portions up to the desired temperature. This heating causes the layer insulation, particularly when stretched prior to use, to soften and shrink as shown diagrammatically in Fig. 2 wherein a layer 4a comprising polyvinylal resin has been shown spaced apart from a layer of insulated wires to illustrate more clearly the effect of the heat treatment thereon. At the temperatures employed, the insulated conductor helices expand. This expansion, in combination with the softening and shrinking of the resin films, causes the layer insulation 4a to assume the contour of the insulated conductor layers 5 as shown more clearly in Fig. 3. In this way a dense, compact, more rigid coil structure is formed. Heating also materially seals the edges of the coil with polyvinylal resin. Baking the coil also beneficially effects the properties of the polyvinylal resin, converting it to a hard, tough, abrasion- and moisture-resistant state.

Any suitable means of baking the coil may be employed. For example, I may use an electrically or other suitably heated oven or a high frequency field. In the latter case the coil is introduced into such field for a very brief interval, for example for a few seconds.

After heat treating the coil as above described, a covering of suitable flexible material of high dielectric strength may be wrapped about the coil further to protect the same from the entrance of dust, moisture, etc. Such wrapping may be, for example, varnished cambric in sheet or tape form, or cotton, wool, silk or other fibrous sheet material coated and impregnated with a suitable insulating varnish, for instance a varnish comprising a polyvinylal resin.

Electrical coils of this invention are suitable for use without the usual impregnation of the entire coil by immersion in a suitable insulating composition. In certain cases, however, it is desirable to coat and partly or completely impregnate the coil with oil, varnish or other surface-coating or impregnating insulating material. Impregnation with oil in accordance with conventional practice has been found to be particularly effective.

For certain applications it is advantageous to use a modified polyvinylal resin as layer insulation. The modified resin also may be used in the form of a varnish for varnish-treating the coil. The polyvinylal resin is modified by incorporating therewith a suitable proportion, for example up to 50 per cent, preferably from about 5 to 40 per cent, of a potentially reactive (heat-hardenable) resin. The resin is modified prior to, or during, the formation of the thin resin sheet or the varnish. Examples of suitable resinous modifying agents are those known, generally, as phenol-aldehyde, antiline-aldehyde, urea-aldehyde resins and the like. A phenol-formaldehyde resin is a preferred modifying agent. The potentially reactive resin is advanced or converted to the infusible insoluble state during baking of the coil or during its subsequent service use. The incorporation of such heat-resisting resin into the polyvinylal resin serves further to improve the rigidity of the coil without materially affecting the high dielectric strength which is characteristic of the polyvinylal resins. The insulating covering on the conductor also may be formed of modified polyvinylal resin, for example, with polyvinylal resin modified with a phenol-aldehyde resin, more particularly a cresol-formaldehyde resin.

Instead of using sheets formed solely of modified or unmodified polyvinylal resin as layer insulation, I may use a laminated sheet material comprising an inner layer or plurality of layers of other flexible insulating material faced on each side with a continuous co-extensive sheet of polyvinylal resin. This inner layer may be, for example, sheet cellulosic material as, for instance, cellulose derivatives such as the esters, ethers, etc. Examples of cellulose esters are cellulose acetate, cellulose propionate, cellulose butyrate and cellulose triesters such as cellulose triacetate. Examples of cellulose ethers are methyl cellulose, ethyl cellulose, benzyl cellulose, etc. Other cellulosic materials also may constitute the inner layer, for example, paper, regenerated cellulose, natural or artificial silk, etc. Likewise, a variety of other synthetic compositions may be used in forming the inner layer, for instance alkyd resins, plasticized polyvinyl halide, for example polyvinyl chloride, rubber hydrochloride, etc. It will be understood, of course, that when the inner layer is formed of a particularly heat-sensitive material, care must be taken during the heat treatment of the coil not to use a temperature such as would char or otherwise injure the inner layer. By forming a composite layer insulation with the exterior portions surfaced with polyvinylal resin, advantage is taken of the adhesiveness and toughness of the polyvinylal resin films in producing a strong, moisture- and abrasion-resistant high dielectric strength insulating material which is easy to apply and entirely impervious to dust and other foreign materials.

The use of polyvinylal resins in the manufacture of an electrical coil 6 as herein described simplifies manufacturing technique. It also makes possible a material reduction in size of the resulting coil and imparts thereto high dielectric strength. The space factor is reduced to a practical minimum, so that compact coils result. Coils produced in accordance with this invention are strong, rigid and have a long service life. They are adapted for such uses as magnet coils, contactor coils, relay coils, meter coils, transformer coils, field coils, and the like.

What I claim as new and desire to secure by Letters Patent of the United States is:

1. An electrical coil comprising a core and an insulated conductor wound in layers on said core, the said conductor layers being separated by sheet layer insulation comprising polyvinylal resin film shrunken from an initially set pre-stretched condition into intimate contact with the winding layer turns to an extent exceeding that obtainable with normal polyvinylal resin film similarly applied.

2. An electrical coil comprising a core and an enameled conductor would in layers on said core, the said conductor layers being separated by thin films comprising a polyvinylal resin obtained by condensing formaldehyde with a product of hydrolysis of polyvinyl acetate and the said films being shrunken under heat from an initially set pre-stretched condition into intimate contact with the winding layer turns to an extent exceeding that obtainable with normal polyvinylal resin film similarly applied.

3. An electrical coil comprising a core and an insulated conductor wound in layers on said core, the said conductor layers being separated by layer insulation formed of flexible sheet polyvinylal resin shrunken from an initially set pre-stretched condition, upon releasing the stress, into intimate contact with the wound conductor layers to an extent exceeding that obtainable with similarly applied flexible sheet polyvinylal resin in normal condition, the entire coil being coated and impregnated with an electrically insulating material.

4. The method of making an electrical coil which comprises winding an insulated conductor upon a core to form a plurality of conductor layers, separating the conductor layers with sheet layer insulation comprising polyvinylal resin film initially stretched in the direction of the conductor windings and set in a stretched condition, and heating the wound coil at a temperature and for a time sufficient to release the stress in the resin film and to cause the said film to shrink upon the wound conductor layers to an extent exceeding that obtainable with normal polyvinylal resin film similarly applied.

5. An electrical coil comprising a core and a conductor insulated with a polyvinylal resin wound in layers on said core, the said conductor layers being separated by sheet layer insulation formed of a composition comprising polyvinylal resin film shrunken from an initially set pre-stretched condition into intimate contact with the wound conductor layers to an extent exceeding that obtainable with normal polyvinylal resin film similarly applied.

6. An electrical coil comprising a core and an insulated conductor wound in layers on said core, the said conductor layers being separated by sheet layer insulation comprising a polyvinylal resin modified with a phenol-aldehyde resin.

RALPH V. BOYER.